United States Patent
Kumar et al.

(10) Patent No.: US 11,470,777 B2
(45) Date of Patent: Oct. 18, 2022

(54) VARIABLE MULCHING ASSEMBLY FOR USE WITH A LAWNMOWER

(71) Applicant: Honda Motor Co., Ltd., Tokyo (JP)

(72) Inventors: Surender Kumar, Mebane, NC (US); Timothy Justin Johnson, Greensboro, NC (US)

(73) Assignee: HONDA MOTOR CO., LTD., Tokyo (JP)

( * ) Notice: Subject to any disclaimer, the term of this patent is extended or adjusted under 35 U.S.C. 154(b) by 771 days.

(21) Appl. No.: 16/052,390

(22) Filed: Aug. 1, 2018

(65) Prior Publication Data

US 2020/0037503 A1    Feb. 6, 2020

(51) Int. Cl.
*A01D 42/00* (2006.01)
*A01D 34/81* (2006.01)
*A01D 34/00* (2006.01)
*A01D 101/00* (2006.01)
*A01D 34/67* (2006.01)

(52) U.S. Cl.
CPC ......... *A01D 42/005* (2013.01); *A01D 34/005* (2013.01); *A01D 34/81* (2013.01); *A01D 34/67* (2013.01)

(58) Field of Classification Search
CPC ...... A01D 34/005; A01D 34/71; A01D 34/81; A01D 34/667; A01D 34/668; A01D 42/005; A01D 34/67
See application file for complete search history.

(56) References Cited

U.S. PATENT DOCUMENTS

| | | | | |
|---|---|---|---|---|
| 2,663,984 A | * | 12/1953 | Clark | A01D 42/005 56/13.7 |
| 2,685,774 A | | 8/1954 | Williams | |
| 3,134,212 A | * | 5/1964 | Gary | A01D 42/005 56/16.4 R |
| 3,531,923 A | * | 10/1970 | Manford | A01D 34/005 56/12.8 |

(Continued)

FOREIGN PATENT DOCUMENTS

| EP | 1364568 A1 | 11/2003 |
|---|---|---|
| EP | 2371203 A1 | 10/2011 |
| WO | 1998034462 A1 | 8/1998 |

OTHER PUBLICATIONS

EP Extended Search Report for EP application 19188486.5 dated Jan. 2, 2020; 7 pp.

*Primary Examiner* — Thomas B Will
*Assistant Examiner* — Joan D Misa
(74) *Attorney, Agent, or Firm* — Armstrong Teasdale LLP

(57) ABSTRACT

A convertible lawnmower includes a housing and a mulching system. The housing includes a discharge opening. The mulching system includes a mounting ring and a shutter ring. The mounting ring is coupled substantially concentrically to the housing and includes an upper surface, a lower surface, and a sidewall that extends substantially axially therebetween. The sidewall is formed with a retaining groove and at least one installation groove. The retaining groove extends at least partially circumferentially within an inner surface of the sidewall and each installation groove extends axially from the lower surface to the retaining groove. The shutter ring is only coupled to mounting ring via the retaining groove such that the shutter ring is selectively shiftable between a mulching mode and a discharge mode.

10 Claims, 6 Drawing Sheets

(56) References Cited

U.S. PATENT DOCUMENTS

| | | | | |
|---|---|---|---|---|
| 5,191,756 | A * | 3/1993 | Kuhn | A01D 34/005 56/13.4 |
| 5,457,947 | A * | 10/1995 | Samejima | A01D 34/005 56/16.7 |
| 5,488,821 | A * | 2/1996 | McCunn | A01D 34/005 56/320.2 |
| 5,499,495 | A * | 3/1996 | Heisman | A01D 34/82 56/17.5 |
| 6,062,013 | A * | 5/2000 | Wolske | A01D 34/005 56/255 |
| 6,735,932 | B2 * | 5/2004 | Osborne | A01D 42/005 56/17.5 |
| 6,751,937 | B2 * | 6/2004 | Kobayashi | A01D 34/71 56/202 |
| 6,843,048 | B2 * | 1/2005 | Osborne | A01D 42/005 56/320.2 |
| 6,874,309 | B1 * | 4/2005 | Bellis, Jr. | A01D 42/005 56/320.2 |
| 6,874,310 | B2 | 4/2005 | Osborne | |
| 6,990,793 | B2 * | 1/2006 | Osborne | A01D 42/005 56/320.1 |
| 7,055,301 | B2 * | 6/2006 | Osborne | A01D 42/005 56/320.1 |
| 7,146,791 | B2 | 12/2006 | Benway et al. | |
| 7,571,593 | B2 * | 8/2009 | Kucera | A01D 43/063 56/202 |
| 7,610,742 | B2 * | 11/2009 | Imanishi | A01D 34/71 56/320.1 |
| 7,621,194 | B1 * | 11/2009 | Tyree | A01D 42/00 56/16.7 |
| 7,866,135 | B2 * | 1/2011 | Davis | A01D 34/71 56/320.2 |
| 8,015,786 | B2 * | 9/2011 | Minami | A01D 42/005 56/320.2 |
| 8,132,396 | B2 * | 3/2012 | Minami | A01D 42/005 56/320.2 |
| 8,234,849 | B2 * | 8/2012 | Shimozono | A01D 42/005 56/320.2 |
| 9,485,911 | B2 * | 11/2016 | Thorman | A01D 42/005 |
| 9,629,307 | B2 * | 4/2017 | Gaeddert | A01D 34/71 |
| 10,524,418 | B1 * | 1/2020 | Wright | A01D 34/81 |
| 10,765,061 | B2 * | 9/2020 | Johnson | A01D 34/69 |
| 10,945,366 | B2 * | 3/2021 | Desai | A01D 34/6806 |
| 10,966,368 | B2 * | 4/2021 | Desai | A01D 34/005 |
| 2003/0217542 | A1 | 11/2003 | Osborne | |
| 2018/0184590 | A1 * | 7/2018 | Takahashi | A01D 34/68 |
| 2020/0170185 | A1 * | 6/2020 | Kaskawitz | A01D 34/71 |
| 2020/0337231 | A1 * | 10/2020 | Kelly | A01D 34/005 |
| 2020/0352094 | A1 * | 11/2020 | Desai | A01D 34/81 |

* cited by examiner

VARIABLE MULCHING ASSEMBLY FOR USE WITH A LAWNMOWER

BACKGROUND

This invention relates generally to lawnmowers, and more particularly, to a variable mulching assembly for use with a lawnmower.

Known lawnmowers can be configured as garden tractors, riding mowers, commercial walk-behind mowers and smaller walk-behind mowers. Known smaller walk-behind mowers include a prime mover mounted to a housing deck. At least some known mower decks associated with garden tractors, riding mowers, and/or commercial walk-behind mowers are removably coupled to a frame of these self-propelled machines in a manner that allows the deck to "float along" the contour of the terrain at an adjustable height above the terrain. Such floating decks rely on a power take-off connected to the prime mover used to propel these self-propelled machines and, therefore, do not include a prime mover. At least one blade is typically mounted in a cutting chamber defined of the deck for any of these embodiments of a lawnmower.

At least some known lawnmowers can also be configured to either mulch the clippings or to discharge the clippings through a discharge chute formed in the housing. During mulching, mowers cut the lawn clippings into fine particles that are blown downward below the surface of the lawn. Discharge mowers either discharge the clippings directly onto the lawn surface or into a bag coupled to the mower for disposal elsewhere. Some lawnmowers, known as convertible lawnmowers, can be converted between mulching lawnmowers and discharge lawnmowers by inserting or removing separate elements within the cutter housing and/or the discharge chute.

At least one other known convertible lawnmower includes a variable mulching system that enables a user to selectively move a plate from a first position during mulching, where the discharge opening is substantially blocked, to a second position where the discharge opening is partially or fully open to enable the clippings to be discharged into a bag or across the lawn surface. Although such convertible mowers are commercially successful, the variable mulching system is fairly complex and uses a ring that is maintained in position relative to the mower housing by a plurality of brackets that are mechanically coupled to the housing via a plurality of fasteners. The installation of such fasteners may be a laborious and time-consuming process when the mower is initially assembled. Moreover, after continued mower usage, disassembling the variable mulching system if components need repair or replacement may be even more time-consuming and difficult.

BRIEF DESCRIPTION

In one aspect, a lawnmower is provided. The lawnmower includes a housing and a mulching system. The housing includes a discharge opening. The mulching system includes a mounting ring and a shutter ring. The mounting ring is coupled substantially concentrically to the housing and includes an upper surface, a lower surface, and a sidewall that extends substantially axially therebetween. The sidewall is formed with a retaining groove and at least one installation groove. The retaining groove extends at least partially circumferentially within an inner surface of the sidewall and each installation groove extends axially from the lower surface to the retaining groove. The shutter ring is only coupled to mounting ring via the retaining groove such that the shutter ring is selectively shiftable between a mulching mode and a discharge mode.

In another aspect, a lawnmower convertible between a mulching mode and a bagging mode is provided. The convertible lawnmower includes a housing, a mounting ring, and a shutter ring. The housing includes a discharge opening and the mounting ring is coupled substantially concentrically to the housing. The mounting ring includes an annular ring portion and a discharge plate portion that extends radially outwardly from the plate portion. The shutter ring is coupled to the mounting ring such that the shutter ring is substantially concentrically aligned with respect to the mounting ring. The shutter ring includes an annular band portion and a shutter plate portion that extends radially outwardly from the plate portion. One of the annular ring portion or the annular band portion includes at least one retaining groove defined therein. The other of the annular ring portion or the annular band portion includes at least one coupler extending outwardly therefrom that is sized for insertion within the at least one retaining groove to rotatably couple the mounting ring to the shutter ring. The shutter ring is only coupled to the mounting ring via the at least one coupler.

DETAILED DESCRIPTION

Embodiments of the present disclosure relate to lawnmowers that include a variable mulching system that is convertible between a mulching mode and a bagging mode. In some embodiments, the variable mulching system is implemented within garden tractors, riding mowers, commercial walk-behind mowers and/or smaller walk-behind mowers. In each implementation, the variable mulching system includes a shutter ring coupled to a mounting ring without the use extraneous mechanical hardware, such as rivets, threaded fasteners, and/or the like. As used in herein, the term convertible refers to lawnmowers that include assemblies that are variably selected to enable the lawnmower to easily change from a mulching mode wherein fine grass clippings are discharged below the surface of the grass being cut, to a discharge mode wherein grass clippings are either discharged from the mower either across the surface of the grass being cut or into a collection bag. The embodiments described herein are exemplary and are not limited to the descriptions provided.

Figure 1:
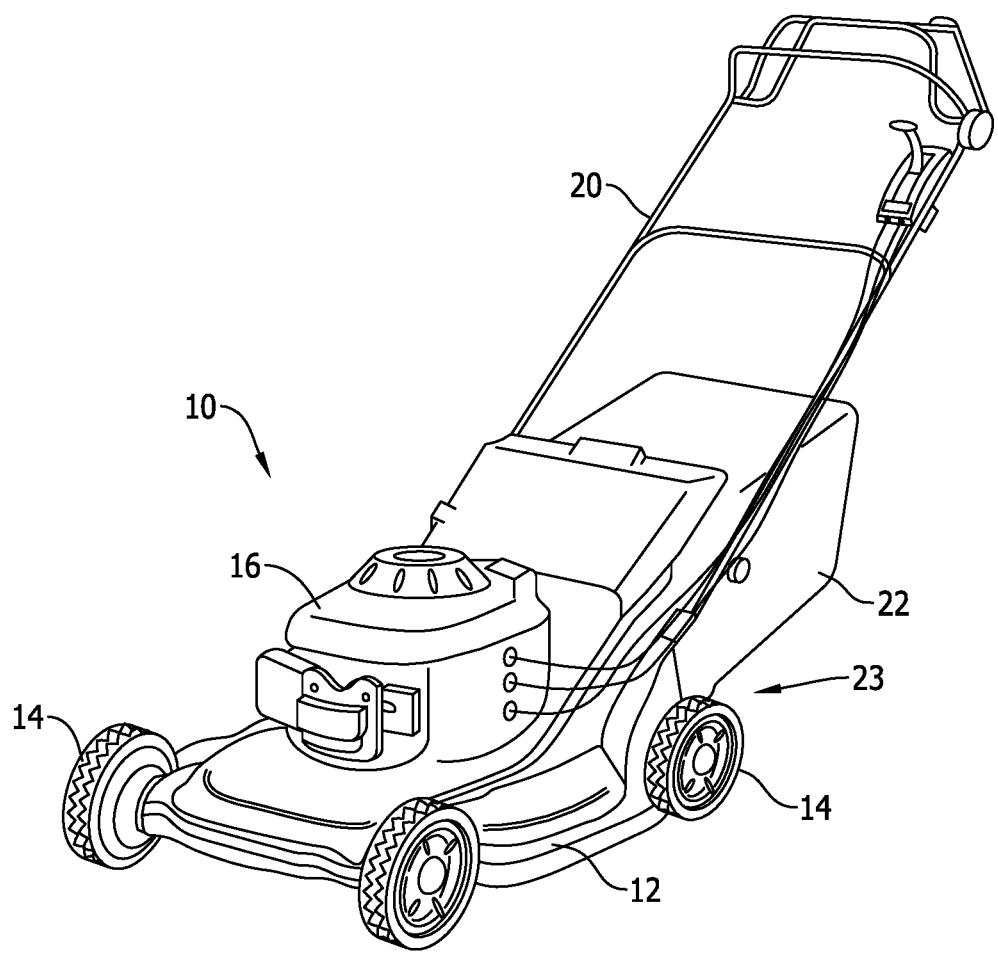
FIG. 1 is a perspective view of an exemplary lawnmower.

FIG. 1 is a perspective view of a lawnmower 10 that may include a variable mulching system (not shown in FIG. 1). More specifically, in the exemplary embodiment, lawnmower 10 includes a deck 12, wheels 14, and a prime mover 16 (e.g., an internal combustion engine or an electric motor) mounted to the deck 12. At least one blade (not shown in FIG. 1) is coupled to prime mover 16 below deck 12, and a steering handle 20 is coupled to deck 12 such that handle 20 extends upwardly from deck 12. In the exemplary embodiment, mower 10 includes an optional collection bag 22 removably coupled a rear side 23 of mower deck 12.

Figure 2:
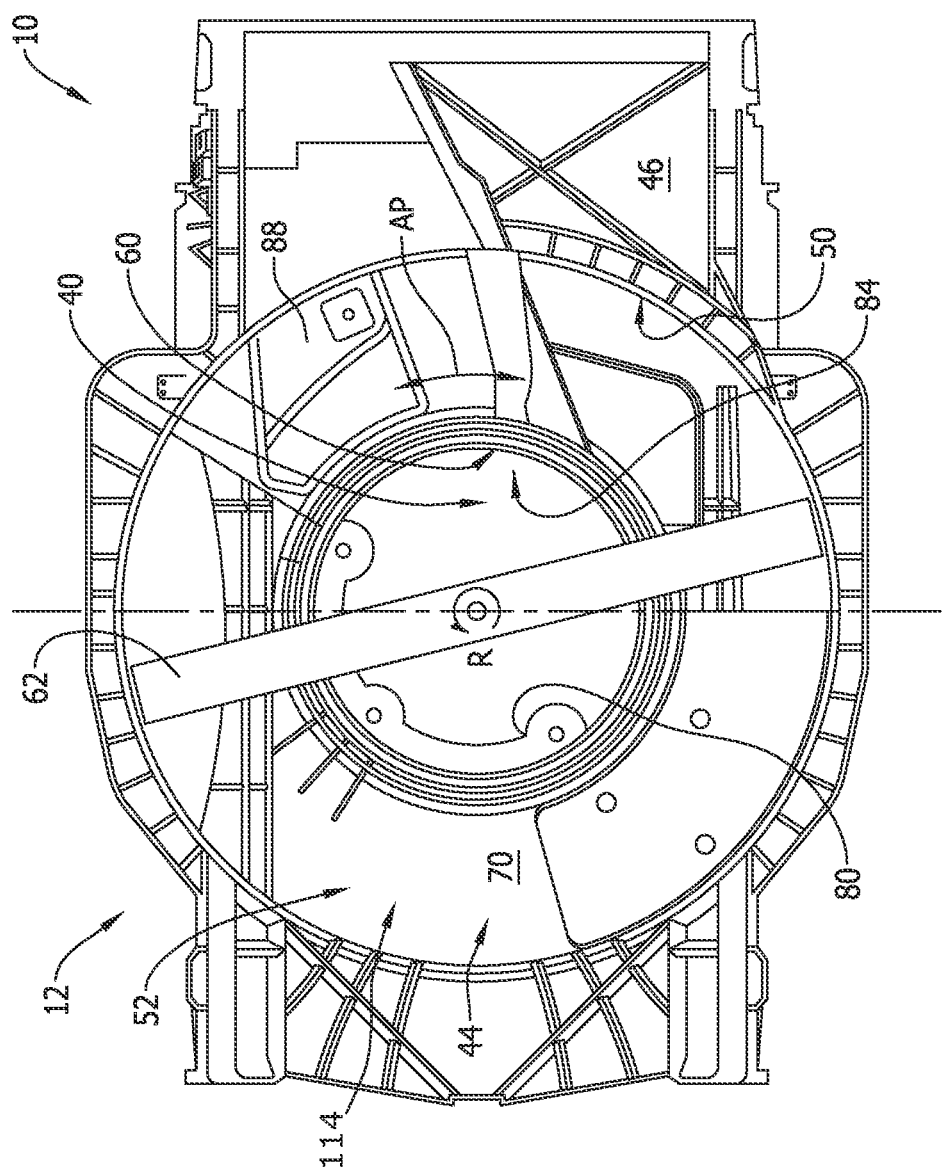
FIG. 2 is a plan view of the bottom of the lawnmower shown in FIG. 1 and including an exemplary variable mulching assembly.

FIGS. 2-7 illustrate the various components upside down relative to FIG. 1. Specifically, FIG. 2 is a plan view of the bottom of deck 12 and illustrates an exemplary variable mulching assembly 40. In the exemplary embodiment, deck 12 includes a cutter housing 44 and a discharge chute 46 that extends outwardly from housing 44. More specifically, cutter housing 44 is formed with a discharge opening 50 that is substantially aligned with discharge chute 46 to enable a cavity 52 defined within cutter housing 44 to be selectively coupled in flow communication with chute 46 as described in more detail below. Collection bag 22 (shown in FIG. 1) can be removably coupled to chute 46 to collect clippings for disposal away from the lawn. In the exemplary embodiment, deck 12 also includes an engine mount 60 that is centrally positioned on cutter housing 44 to prime mover 16 (shown in FIG. 1) to couple to deck 12.

A blade 62 coupled to prime mover 16 rotates within cutter housing 44. In the exemplary embodiment, blade 62 is a mulching blade configured as a single cutting element. In alternative embodiments, blade 62 may include multiple cutting elements. In each embodiment, blade 62 rotates about an axis of rotation R in cutting plane defined within cutter housing 44. Vegetation being by blade 62 is cut at a level of the cutting plane and tends to circulate adjacent an upper surface 70 of cutter housing 44 until a saturation amount of circulating clippings is reached. After the saturation level of clippings is reached, the circulating clippings begin to fall back down across blade 62 where they are cut again and blown into the lawn below the cutting plane when the mower 10 is in a full mulching mode, and/or are blown through discharge opening 50 and into discharge chute 46 when mower 10 is in a full discharge mode. It should be noted, as described in more detail below, variable mulching assembly 40 may be placed in an intermediate mode between the full mulching and discharge modes.

Figure 3:
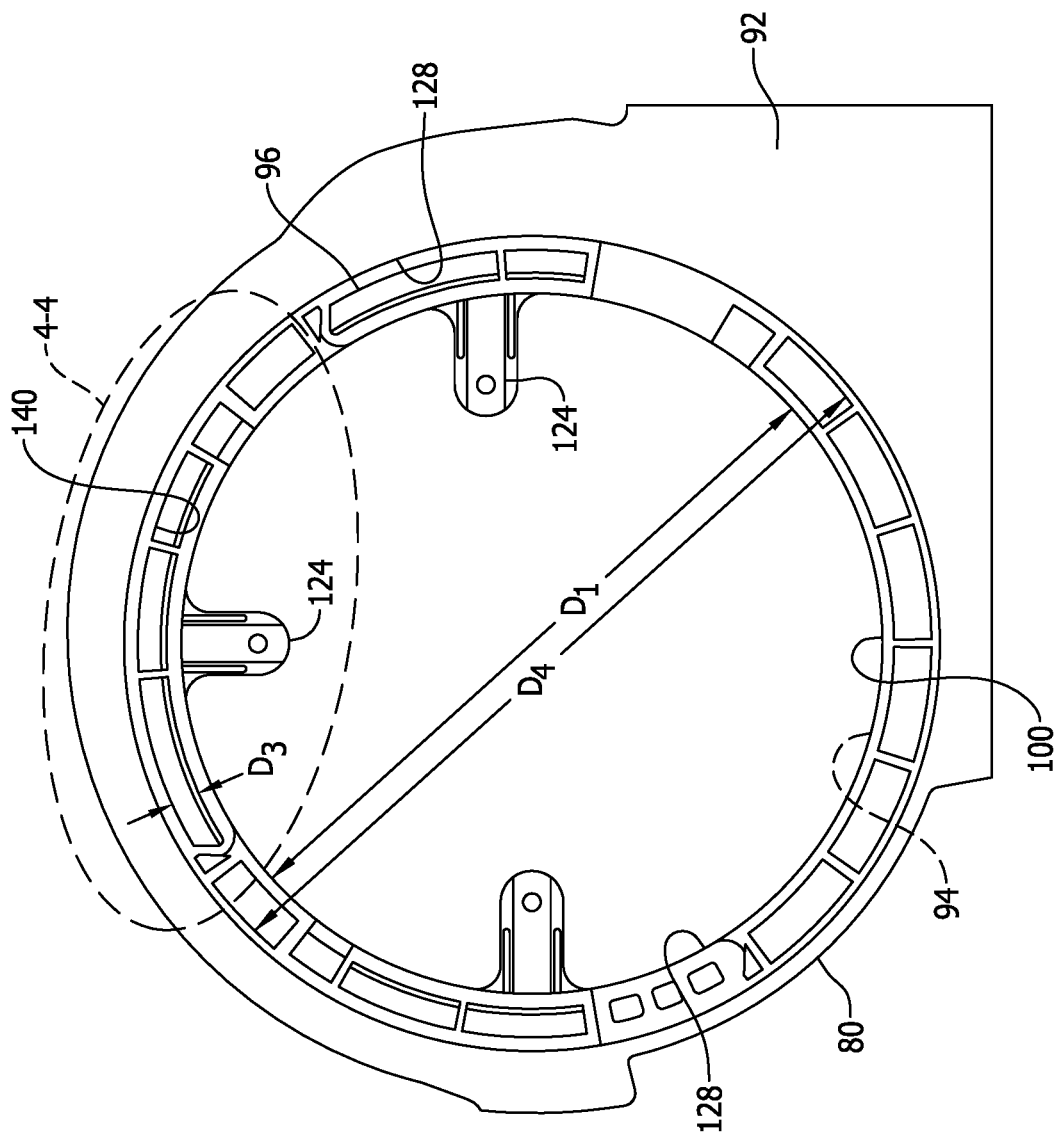
FIG. 3 is a plan view of the bottom side of a portion of an exemplary mounting ring that may be used with the mulching assembly shown in FIG. 2.
Figure 4:
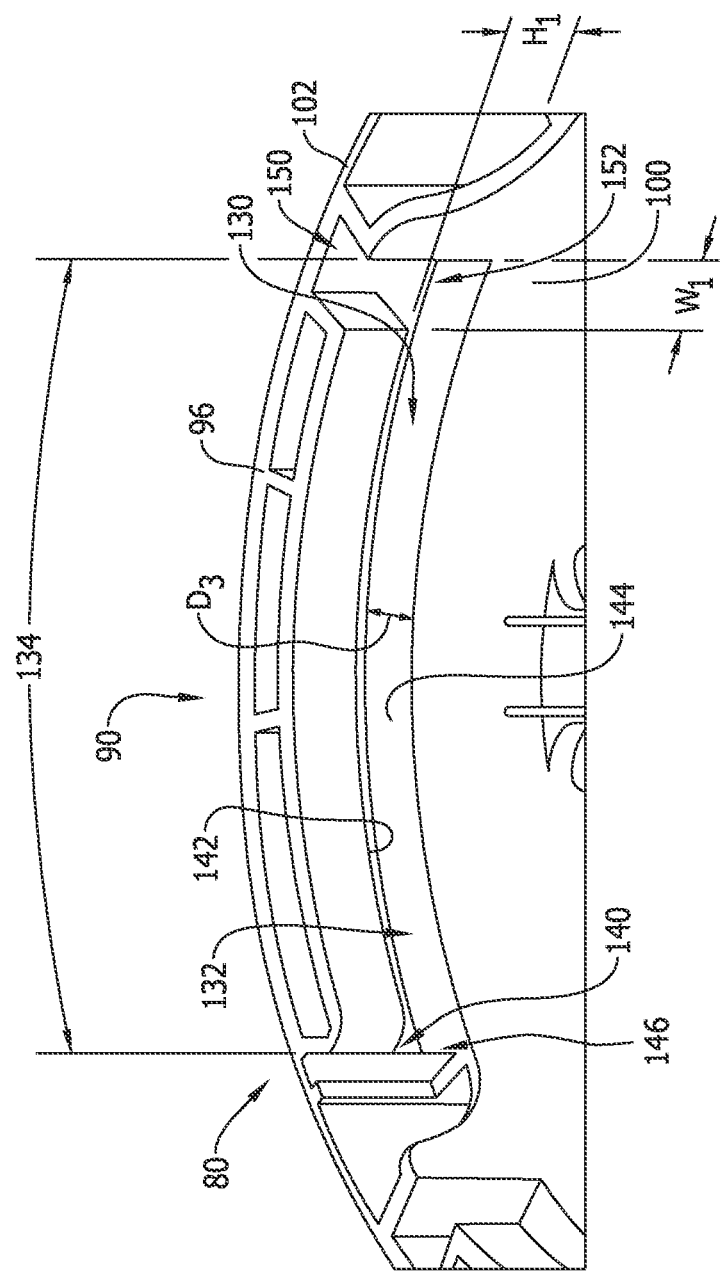
FIG. 4 is an enlarged perspective view of an arcuate portion of the mounting ring shown in FIG. 3 and taken along area 4-4.
Figure 5:
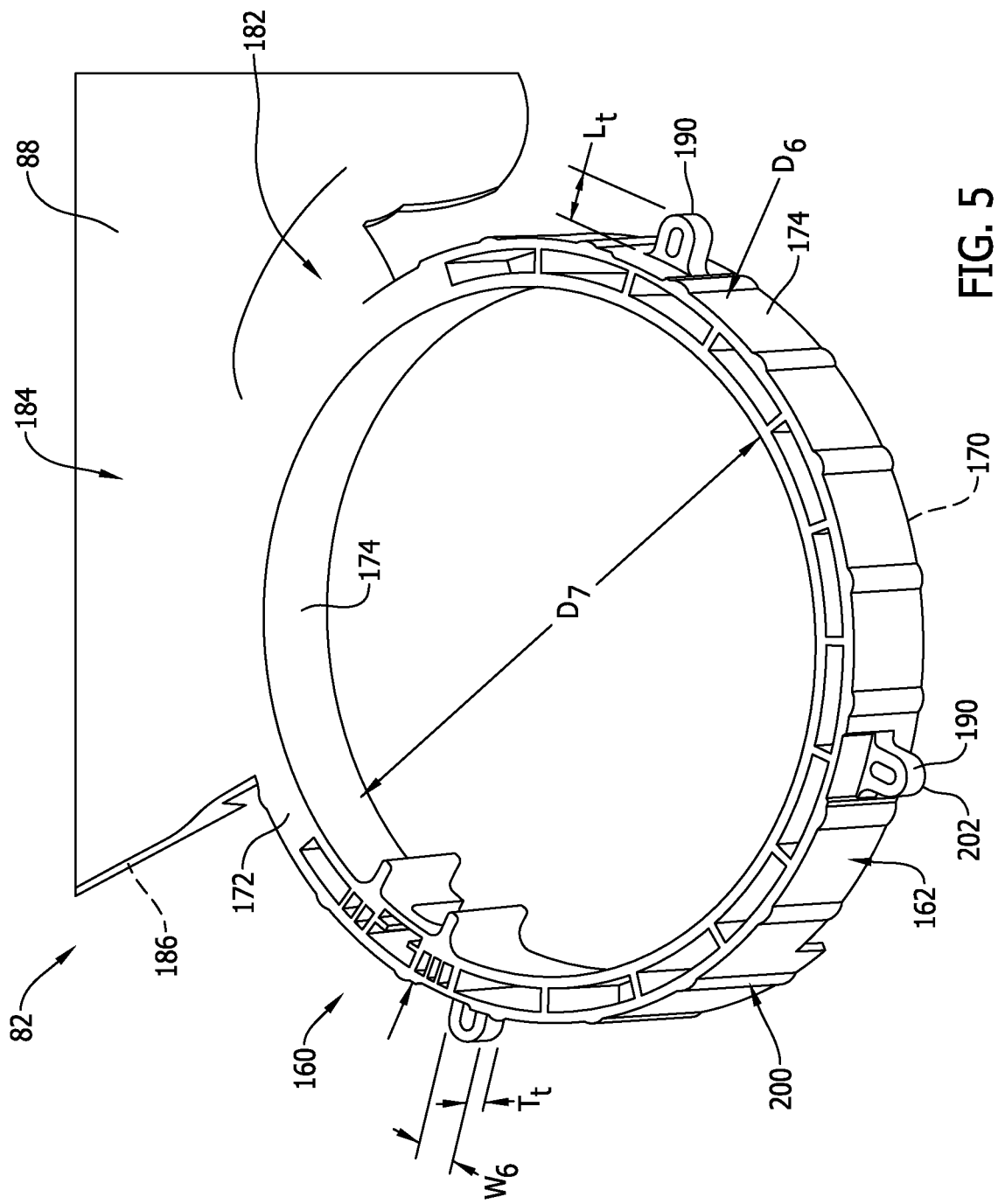
FIG. 5 is a perspective view of the bottom side of a portion of an exemplary shutter ring that may be used with the mulching assembly shown in FIG. 2.
Figure 7:
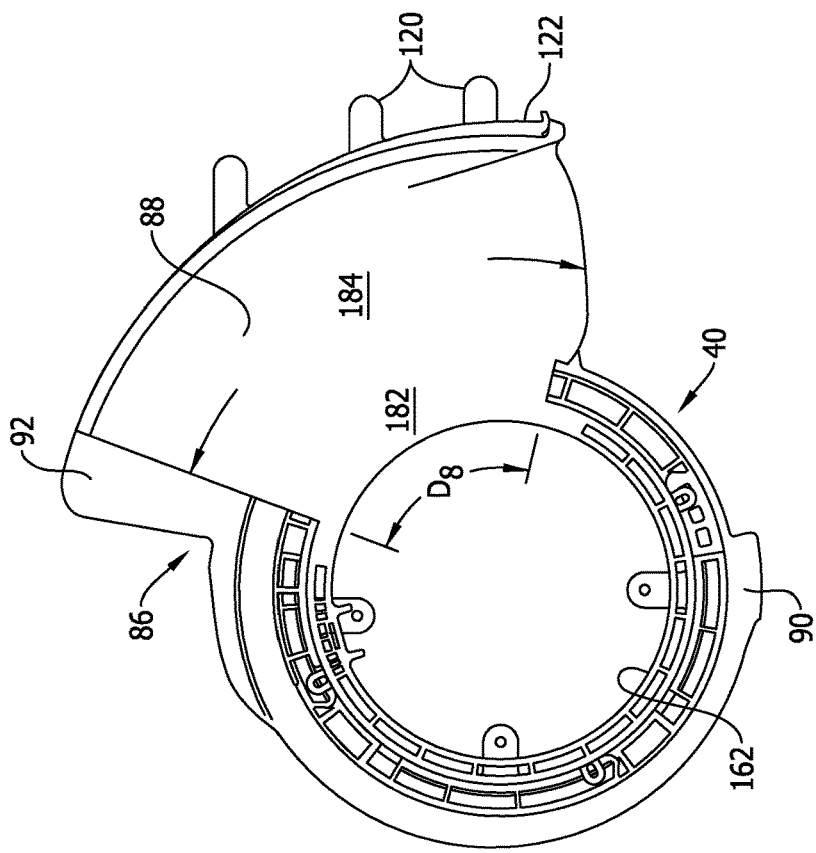
FIG. 7 is a plan view of the bottom of the mulching assembly shown in FIG. 6 and in a discharge mode.
Figure 6:
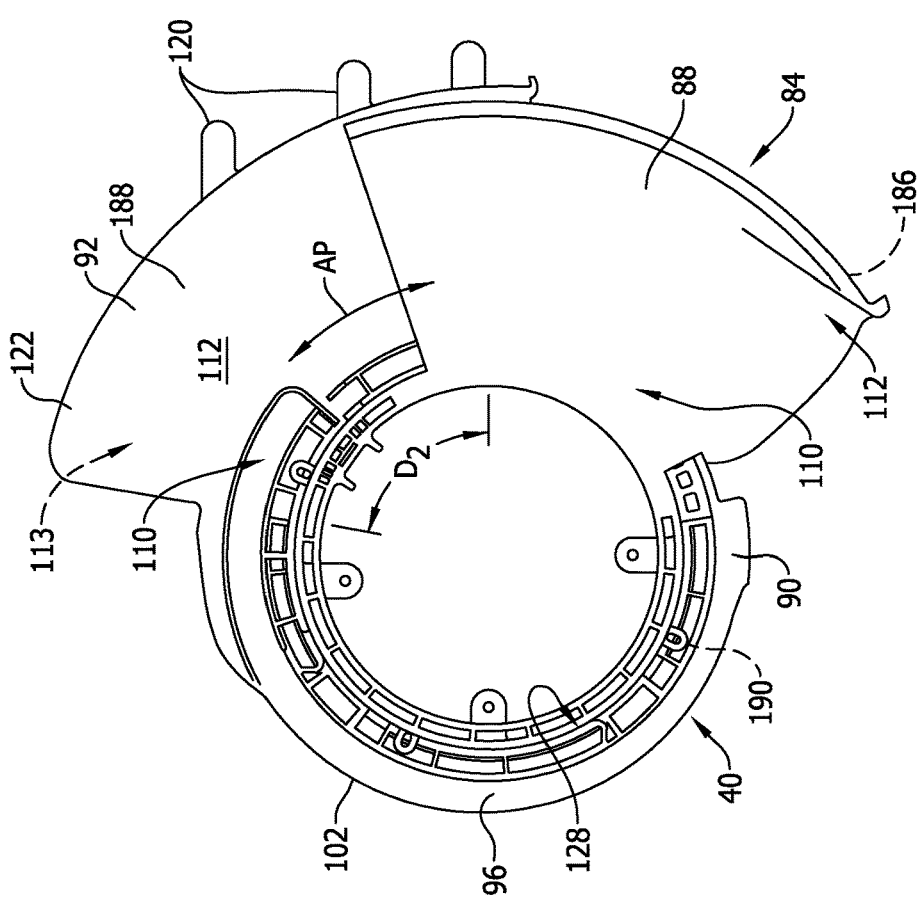
FIG. 6 is an enlarged plan view of the bottom of the mulching system shown in FIG. 2 and in a mulching mode.

FIG. 3 is a plan view of the bottom side of a portion of an exemplary mounting ring 80 that may be used with mulching assembly 40. FIG. 4 is an enlarged perspective view of an arcuate portion of mounting ring 80 and taken along area 4-4. FIG. 5 is a perspective view of the bottom side of a portion of an exemplary shutter ring 82 that may be used with mulching assembly 40. FIG. 6 is an enlarged plan view of the bottom of variable mulching system 40 and in a mulching mode. FIG. 7 is a plan view of the bottom of variable mulching assembly 40 and in a discharge mode.

Variable mulching assembly 40 is selectively moveable or shiftable within cutter housing 44 between a first position 84 (FIG. 6), i.e., a full mulching mode, and a second position 86 (FIGS. 2 and 7), i.e., a full discharge/bagging mode. More specifically, and as described in more detail below, variable mulching assembly 40 includes a shutter plate 88 (only a portion of plate 88 is shown in FIG. 5) that can translate along an arcuate path AP between first and second positions 84 and 86, respectively. Shutter plate 88 is selectively moveable along arcuate path AP between positions 84 and 86 and may be positioned at any intermediate location between positions 84 and 86.

In the exemplary embodiment, second position 86 is a full discharge or full bagging position where discharge opening 50 is substantially unobstructed by shutter plate 88. In contrast, in the exemplary embodiment, first position 84 can be a full mulching position wherein plate 88 substantially obstructs discharge opening 50. Additionally, plate 88 can translate to any position intermediate first and second positions 84 and 86, respectively. In the exemplary embodiment, cutter housing 44 is annular and shutter plate 88 extends circumferentially across a sector of cutter housing 44.

Referring to FIGS. 3 and 4, in the exemplary embodiment, mulching assembly 40 includes a mounting ring 80 that is coupled substantially concentrically to cutter housing 44. More specifically, in the exemplary embodiment, mounting ring 80 includes an annular ring portion 90 and a discharge plate portion 92 (only a portion of plate 92 is shown in FIG. 3). In the exemplary embodiment, ring portion 90 is formed integrally with plate portion 92 in a one-piece assembly. Alternatively, ring portion 90 may be formed of several independent pieces coupled together to form a unitary component. Ring portion 90 is substantially circular in the exemplary embodiment, and includes an upper surface 94, a lower surface 96, and a sidewall 100 that extends generally perpendicularly there between. In the exemplary embodiment, sidewall 100 is annular and is formed with an inner diameter $D_1$. Discharge plate portion 92 extends generally radially outwardly from sidewall 100 along a circumferential distance $D_2$ across a sector of ring portion 90.

In the exemplary embodiment, discharge plate 92 is formed with a generally arcuate profile that extends downwardly from an outer surface 102 of annular ring portion 90. More specifically, in the exemplary embodiment, discharge plate 92 is formed with a generally horizontal portion 110 and a contoured portion 112 that extends downwardly from portion 110. Portions 110 and 112 cooperate to form plate 92 with an upper surface 113 having an overall contour that substantially mirrors a contour defined by an inner surface 114 (shown in FIG. 2) of cutter housing 44 (shown in FIG. 2).

Moreover, in the exemplary embodiment, mounting ring 80 also includes a plurality of alignment pins 120 that extend outwardly from a lower edge 122 of discharge plate 92. Pins 120 facilitate securing plate edge 122 to cutter housing 44 in proper alignment. Moreover, pins 120 "murphy proof" the installation of ring 80 and prevent ring 80 from being coupled to cutter housing 44 in any improper orientations. In addition, mounting ring 80 also includes a plurality of mounting tab features 124 that extend radially inwardly from an inner surface 128 of sidewall 100. Sidewall inner surface 128 defines inner diameter $D_1$. Mounting tab features 124 each facilitate securing mounting ring 80 to cutter housing 44 via fasteners (not shown).

In the exemplary embodiment, and as best seen in FIG. 4, mounting ring 80 includes at least one shutter retaining groove 130 defined therein. More specifically, in the exemplary embodiment, retaining groove 130 is segmented into three arcuate segments 132. Segments 132 are each defined within mounting ring sidewall 100, and arcuate segments 132 are substantially axially-aligned relative to sidewall 100. In the exemplary embodiment, each segment 132 has an arcuate length 134 and segments 132 are spaced substantially equally in areas of sidewall 100 that are not within the circumferential distance $D_2$ bounded by discharge plate portion 92. Moreover, each groove 130 extends a depth $D_3$ into sidewall 100 from sidewall inner surface 128. In the exemplary embodiment, segments 132 are substantially identical and a depth $D_3$ and a height $h_1$ of each groove segment 132 are each substantially constant within each segment 132. Accordingly, each groove segment 132 is defined by a rear wall 140, a lower wall 142, and an upper wall 144. Groove segments are radially aligned as well such that segment rear walls 140 collectively define a groove outer diameter $D_4$.

Moreover, as described above, in the exemplary embodiment, each groove segment 132 is arcuate and has a circumferential length 134 that extends accurately from an end 146 of each segment 132 to an installation groove 150 formed at the opposite end 152 of each segment 132 from end 146. Each installation groove 150 is defined in sidewall 100 at depth $D_3$, and each extends in flow communication from each respective segment 132. More specifically, each installation groove 150 extends substantially perpendicularly in an axial direction from each retaining groove segment 132 to ring portion lower surface 96 with a width $W_1$. Alternatively, installation groove 150 and/or retaining groove 130 may have any other orientation that enables mulching assembly 40 to function as described herein.

Referring to FIG. 5, in the exemplary embodiment, mulching assembly 40 also includes a shutter ring 82 that is coupled substantially concentrically to cutter housing 44. More specifically, in the exemplary embodiment, and as described in more detail below, shutter ring 82 is rotatably coupled, substantially concentrically to mounting ring 80. Moreover, in the exemplary embodiment, shutter ring 82 includes an annular band portion 162 and shutter plate 88. In the exemplary embodiment, band portion 162 is formed integrally with shutter plate 88 in a one-piece assembly. Alternatively, ring 160 may be formed of several independent pieces coupled together to form a unitary component. Band portion 162 is substantially circular in the exemplary embodiment, and includes an upper surface 170, a lower surface 172, and a sidewall 174 that extends generally perpendicularly there between. In the exemplary embodiment, sidewall 174 is annular and is formed with an outer diameter $D_6$ and an inner diameter $D_7$. Shutter plate 88 extends generally radially outward from sidewall 174 along a circumferential distance $D_8$ across a sector of band portion 162.

In the exemplary embodiment, shutter plate 88 is formed with a generally arcuate profile that extends downwardly from band portion lower surface 172 and along an outer surface 180 of annular band portion 162. More specifically, in the exemplary embodiment, shutter plate 88 is formed with a generally horizontal portion 182 and a contoured portion 184 that extends downwardly from portion 182. Portions 182 and 184 cooperate to form plate 88 with an upper surface 186 having an overall contour that substantially mirrors a contour defined by a lower surface 188 of discharge plate 92.

In the exemplary embodiment, shutter ring 82 includes a plurality of couplers 190 that extend radially from annular band portion 162. In the exemplary embodiment, couplers 190 extend radially outwardly from band portion 162. Specifically, in the exemplary embodiment, shutter ring 82 includes three couplers 190. Alternatively, shutter ring 82 may include any number of couplers 190, i.e., more or less than three couplers 190, that enables mulching assembly 40 to function as described herein. In the exemplary embodiment, couplers 190 are spaced substantially equally in areas of sidewall 174 that are not within the circumferential distance $D_8$ bounded by shutter plate 88. As such, in the exemplary embodiment, couplers 190 are separated by approximately 90°. Moreover, in the exemplary embodiment, each coupler 190 is substantially axially-centered between band portion upper and lower surfaces 170 and 172, respectively. Alternatively, couplers 190 may be positioned at any orientation and/or spacing that enables mulching assembly 40 to function as described herein.

Couplers 190, in the exemplary embodiment, extend outwardly from a radially outer surface 200 of sidewall 174. Moreover, in the exemplary embodiment, couplers 190 are substantially identical and each has a U-shaped cross-sectional profile defined by a width $W_t$, an axial thickness $T_t$ and a length $L_t$. Coupler length $L_t$ is measured from sidewall 174 to an end 202 of each coupler 190. In the exemplary embodiment, coupler length $L_t$ is slightly shorter than mounting ring groove depth $D_3$ and coupler thickness $T_t$ is slightly shorter than groove height $h_1$. Furthermore, coupler width $W_t$ is slightly shorter than installation groove width $W_1$.

In the exemplary embodiment, shutter ring 82 is rotatably coupled to mounting ring 80 without the use of mechanical fasteners, as are typically used in known mulching assemblies. Specifically, during assembly, shutter ring 82 is positioned adjacent to mounting ring 80 such that each shutter ring coupler 190 is substantially centered relative to each installation groove 150. Shutter ring 82 is then inserted concentrically into mounting ring 80 such that each coupler 190 is received in sliding contact within each installation groove 150. Shutter ring 82 is inserted into mounting ring 80 until couplers 190 "bottom out" in each installation groove 150 and ring 160 cannot be inserted further into mounting ring 80. Shutter ring 82 is then rotated such that couplers 190 are slid into a respective retaining groove segment 132 such that shutter ring 82 is rotatably coupled to mounting ring 80 in a "twist-fit connection". Because coupler ends 202 are rounded, wear between couplers 190 and mounting ring 80 is facilitated to be minimized. Moreover, in the exemplary embodiment, both mounting ring 80 and shutter ring 82 are fabricated from any material that also facilitates preventing wear between the components. For example, in one embodiment, mounting ring 80 and/or shutter ring 82 are fabricated from a molded plastic material.

When fully assembled, shutter ring 82 is rotably coupled substantially concentrically within mounting ring 80 such that shutter ring band portion 162 is in slidable contact with mounting ring portion 90. More specifically, when fully assembled, couplers 190 are retained within groove segments 132, and band portion outer surface 200 is in slidable contact with ring portion inner surface 128. Moreover, when fully assembled, depending on a relative position of shutter ring 82 and mounting ring 80, shutter plate upper surface 186 substantially mates against discharge plate lower surface 188 in slidable contact.

In an alternative embodiment, mounting ring 80, rather than shutter ring 82, includes a plurality of couplers, such as couplers 190, which are sized and oriented to engage a retaining groove, such as groove 130, that is defined in shutter ring 82, rather than in mounting ring 80. Moreover, in another alternative embodiment, mounting ring 80 is sized and configured to couple within shutter ring 82 such that shutter ring 82 circumscribes mounting ring 80. In such an embodiment, shutter ring 82 may still move relative to mounting ring 80.

During mower operations, after mounting ring 80 is securely coupled to cutter housing 44 via mounting tab features 124, shutter ring 82 is selectively moveable by a user via a handle (not shown). More specifically, during normal operations, although selectively moveable within retaining grooves 132, shutter ring is constrained axially within retaining grooves 132 and circumferential movement within grooves 132 is limited to prevent couplers 190 from entering installation grooves 150. As such, variable mulching assembly 40 is selectively shiftable from first position 84 to second position 86, and may be positioned intermediate positions 84 and 86. More specifically, when fully assembled, shutter plate 88 is selectively moveable along arcuate path AP The relative position of shutter plate 88 controls the circulation of clippings within cutter housing 44. As shutter plate 88 is selectively moved from the full discharge/bagging position 86 to the full mulching position 84, shutter plate 88 extends by various degrees across discharge opening 50. As opening 50 becomes obstructed, clipping that could be discharged through opening 50 are recirculated within cutter housing 44 and redirected towards blade 18 for mulching, prior to being blowing into the lawn. When at least a portion of discharge opening 50 is unobstructed by shutter plate 88, at least some of the clippings circulating within cutter housing 44 can be discharged from housing 44 through opening 50. By regulating the position of shutter plate 88, in response to the cutting conditions, the operator can control the amount of grass being collected and mulched at any given time.

The above-described energy absorption system provides a mulching assembly that is variably positionable between a full mulching mode and a full discharge mode, and any position intermediate those two modes. The mulching assembly described herein is cost-effective to manufacture and assemble and facilitates reducing labor costs and the number of components typically required in known mulching assemblies. More specifically, the mulching assembly described herein uses a mounting ring that is rotatably coupled to a shutter plate without the use of mechanical hardware, adhesives, welding, or any other similar fastening technique. Rather, the mulching assembly described herein is rotatably coupled in a twist fit connection. As a result, a mulching assembly is provided that facilitates increasing the flexibility to the mower operator while reducing costs in a cost-effective and reliable manner.

Exemplary embodiments of impact absorption systems are described above in detail. Although the impact absorption systems are herein described and illustrated in association with a walk-behind lawnmower, the invention is also intended for use on commercial walk-behind mowers, riding mowers and lawn tractors. Moreover, it should also be noted that the components of the mulching assembly are not limited to the specific embodiments described herein, but rather, aspects of each component may be utilized independently and separately from other components and methods of assembly described herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A lawnmower convertible between a mulching mode and a bagging mode, said lawnmower comprising:
   a housing comprising a discharge opening;
   a mounting ring coupled substantially concentrically to said housing, said mounting ring comprising an annular ring portion and a discharge plate portion extending radially outwardly from said annular ring portion; and
   a shutter ring coupled to said mounting ring such that said shutter ring is substantially concentrically aligned with respect to said mounting ring, said shutter ring comprising:
   an annular band portion; and
   a shutter plate portion extending radially outwardly from said annular band portion, one of said annular ring portion and said annular band portion comprises at least one retaining groove defined therein, the other of said annular ring portion and said annular band portion comprises a first coupler and a second coupler extending radially outward therefrom, said first and second couplers spaced a first circumferential distance apart, said first coupler and said second coupler each sized for insertion within said at least one retaining groove to rotatably couple said shutter ring to said mounting ring, said shutter ring is only coupled to said mounting ring via said first and second coupler.

2. A lawnmower in accordance with claim 1 wherein said at least one retaining groove is oriented to maintain said shutter ring in rotatable contact with said mounting ring such that said first and second couplers remain secured within said at least one retaining groove during lawnmower operations.

3. A lawnmower in accordance with claim 2 wherein said first and second couplers extend radially outwardly from a radial outer surface of said annular band portion, said at least one retaining groove is defined within a radially inner surface of said annular ring portion.

4. A lawnmower in accordance with claim 2 wherein said annular ring portion comprises a radially inner surface and a radially outer surface, said annular band portion comprises a radially inner surface and a radially outer surface, said at least one retaining groove is oriented to retain said first and second couplers therein such that the radially inner surface of said annular ring portion is slidably coupled against said annular band portion outer surface.

5. A lawnmower in accordance with claim 2 wherein said shutter ring is selectively shiftable between the mulching mode and the bagging mode.

6. A lawnmower in accordance with claim 5 wherein a portion of said shutter ring substantially blocks said housing discharge opening when said shutter ring is rotated to the mulching mode.

7. A lawnmower in accordance with claim 2 wherein said at least one retaining groove is configured to retain said first and second couplers therein such that said first and second couplers are slidable within said at least one retaining groove and is substantially prevented from moving axially relative to said mounting ring during lawnmower operations.

8. A lawnmower in accordance with claim 2 wherein said at least one retaining groove comprises at least two arcuate portions, said at least two arcuate portions are substantially coaxially aligned relative to said mounting ring.

9. A lawnmower in accordance with claim 8 wherein said at least one retaining groove comprises a shutter retaining groove and an installation groove, said shutter retaining groove extends an arcuate distance circumferentially within one of said annular ring portion and said annular band portion, said installation groove extends from said arcuate portion axially to one of a top surface and a bottom surface of one of said annular band portion and said annular ring portion.

10. A lawnmower in accordance with claim 9 wherein said installation groove is sized to receive said first and second couplers therein to:
- enable said first and second couplers to be slidably inserted into said at least one retaining groove arcuate portion during coupling of said shutter ring to said mounting ring; and
- enable said first and second couplers to be slidably removed from said at least one retaining groove arcuate portion during disassembly of said shutter ring from said mounting ring.

\* \* \* \* \*